(12) United States Patent
Hetrick et al.

(10) Patent No.: US 10,651,970 B2
(45) Date of Patent: May 12, 2020

(54) SYSTEM AND METHOD FOR PREDICTIVE LINK PLANNING

(71) Applicant: Northrop Grumman Systems Corporation, Falls Church, VA (US)

(72) Inventors: James M. Hetrick, Torrance, CA (US); Erin Yvonne Elissa Stewart Meadows, Inglewood, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/626,450

(22) Filed: Jun. 19, 2017

(65) Prior Publication Data

US 2018/0367241 A1    Dec. 20, 2018

(51) Int. Cl.
*H04L 1/00*    (2006.01)
(52) U.S. Cl.
CPC .......... *H04L 1/0022* (2013.01); *H04L 1/0003* (2013.01); *H04L 1/0009* (2013.01); *H04L 1/0016* (2013.01); *H04L 1/0032* (2013.01); *H04L 1/0033* (2013.01)
(58) Field of Classification Search
CPC .................................................. H04L 1/0022
USPC ....................................................... 375/296
See application file for complete search history.

(56) References Cited

U.S. PATENT DOCUMENTS

| | | | | |
|---|---|---|---|---|
| 2003/0171103 | A1* | 9/2003 | Shields | H04W 52/226 455/232.1 |
| 2006/0019679 | A1* | 1/2006 | Rappaport | G01S 5/0252 455/456.5 |
| 2010/0302102 | A1* | 12/2010 | Desai | G01S 3/50 342/417 |
| 2012/0289225 | A1 | 11/2012 | Treesh et al. | |
| 2014/0266867 | A1 | 9/2014 | Liu et al. | |
| 2017/0155443 | A1 | 6/2017 | Haziza et al. | |

OTHER PUBLICATIONS

International Preliminary Report on Patentability in related PCT Application No. PCT/US2018/036061, dated Jan. 2, 2020, 11 pages.

* cited by examiner

*Primary Examiner* — Lihong Yu
(74) *Attorney, Agent, or Firm* — McCracken & Gillen LLC

(57) ABSTRACT

A system and method for predictive adaptive coding and modulation (ACM) is disclosed. Predictive ACM is used between a transmitting terminal that is in motion and a stationary receiving terminal without a return link between the terminals where the geometry and link impairments are known in advance. A system and method for predictive ACM in a system including one or more relay terminals between the transmitting and receiving terminals, where the geometry and link impairments between all of the terminals are known in advance is also disclosed.

10 Claims, 5 Drawing Sheets

Link Geometry at time $t_1$

Link Geometry at time $t_2$

SYSTEM AND METHOD FOR PREDICTIVE LINK PLANNING

BACKGROUND

The invention relates generally to adaptive coding and modulation (ACM) and more particularly to ACM in a transmitter without the use of link parameters provided over a return link from a receiver in a communications system.

Adaptive coding and modulation (ACM), also known as link adaptation, is used in wireless communication systems to coordinate transmissions between transmitters and receivers. ACM involves adjusting various aspects of data transmission such as the type of modulation coding or bit error rates in accordance with information about the radio link, or channel. Channel state information (CSI) is commonly received via a return link from a receiver, forming a closed loop system. The receiver primarily provides information about how channel conditions are changing.

A representative prior art system 10 is shown in FIG. 1. At the beginning of a transmission, i.e. when a link is initially established, a transmitting terminal 12 chooses initial link parameters blindly, without a priori information, and begins transmission 14 to receiving terminal 16. Receiving terminal 16 receives transmission 14 and generates CSI, for example, an estimate of the signal to noise ratio (SNR) or bit error rate (BER) of the received signal. These are sent over return link 18 back to transmitting terminal 12. In response, transmitting terminal 12 adapts link parameters for subsequent transmissions based on the received CSI. Link metrics are sent at a rate that is commensurate with the rate of change for the channel of interest, with values typically ranging from seconds to tens of seconds.

Unfortunately, in many communications systems, providing a return link is challenging or impractical. Two such links are provided as examples. The first is an application in which a communications link is one directional, such as when the transmitting terminal is a telemetry or sensor link. In this application adding return link hardware, comprised of an additional receiver, low-noise amplifier, and diplexer to the transmitting terminal, solely for the purpose of receiving return link metrics, may be impractical due to the additional cost, size, weight, and power required. A second application where a return link is challenging or impractical is one in which a link is designed to minimize the probability of detecting the signal being transmitted. In this application, adding a secondary link in the opposite direction to relay CSI could conceivably double the chances of the signal being detected, which is an undesirable tradeoff.

Thus, a need exists for predictive link planning from a transmitting terminal and to a receiving terminal without a return link from the receiving terminal to the transmitting terminal. In addition, a need exists for ACM and predictive link planning in a system in which the geometry and link impairments between two or more communicating terminals can be predicted ahead of time.

SUMMARY

The invention in one implementation encompasses a system and method for predictive adaptive coding and modulation (ACM) between a transmitting terminal and a receiving terminal without a return link between the terminals where the geometry and impairments of the link are known in advance. There is a further need for predictive ACM in a system including one or more relay terminals between the transmitting and receiving terminals, where the geometry and impairments of the links between all of the terminals are known in advance.

In an embodiment, the invention encompasses a method of transmitting data from a transmitting terminal to a receiving terminal over a channel, the method including steps of determining a series of locations for each of the transmitting and receiving terminals; determining a link geometry of the channel between the transmitting terminal and the receiving terminal for each location in the series of locations; determining channel impairments for the link geometries; predicting signal-to-noise ratios (SNRs) of the channel for the link geometries and channel impairments; storing channel parameters based on the predicted SNRs in a lookup table; and transmitting data from the transmitting terminal using channel parameters retrieved from the lookup table.

In a further embodiment, the step of determining a link geometry further includes determining a distance and associated pointing angles between the transmitting and receiving terminals for each location in the series of locations.

In any of the above embodiments, the channel parameters are retrieved from the lookup table using a location of the transmitting terminal.

In any of the above embodiments, the channel parameters are retrieved from the lookup table using a time elapsed since a previous access to the lookup table.

In any of the above embodiments, the channel parameters further include at least one of a channel symbol rate, modulation type, code rate, code type or frequency.

In yet another embodiment, the channel includes one or more relay terminals and the step of determining a series of locations further include determining locations of the one or more relay terminals.

In the above embodiments, the step of determining a link geometry of the channel includes determining a first link geometry between the transmitting terminal and the one or more relay terminals and a second link geometry between the one or more relay terminals and the receiving terminal, for each location in the series of locations.

In another embodiment, before the step of determining a series of locations, a step of using elapsed time or location to select the receiving terminal from a set of receiving terminals based on a priori knowledge of link geometry and an estimate of the current location of the transmitting terminal is performed.

In any of the above embodiments, the receiving terminal detects changes in the transmitting data and automatically adapts to the modulation and coding selected by the transmitting terminal.

In any of the above embodiments, the lookup table further includes a plurality of lookup tables for different frequencies or times of year.

In another embodiment, the invention encompasses communication system for providing predictive adaptive coding and modulation (ACM) during transmission between terminals, having: one or more receiving terminals for detecting changes in a transmission rate and automatically adapting its demodulation to the changes; and a transmitting terminal for transmitting data to the one or more receiving terminals using predictive ACM by selecting channel parameters from a lookup table without receiving channel parameters over a return link from the one or more receiving terminals.

In a further embodiment, the lookup table includes channel parameters for a plurality of locations of the transmitting terminal and is accessed using a current location of the transmitting terminal.

In another embodiment, the lookup table includes channel parameters for a plurality of locations along a planned trajectory of the transmitting terminal and is accessed using a time elapsed since a previous access of the lookup table.

In any of the above embodiments, the lookup table includes a plurality of lookup tables for different frequencies or times of year.

In any of the above embodiments, the channel parameters further comprise at least one of a channel symbol rate, modulation type, code rate, code type or frequency.

In any of the above embodiments, the channel parameters are based on a predicted signal-to-noise ratio (SNR).

In another embodiment, the invention encompasses a transmitting terminal in a communication system, the transmitting terminal sending data to a receiving terminal in the communication system using the method described above.

BRIEF DESCRIPTION OF THE DRAWINGS

Features of example implementations of the invention will become apparent from the description, the claims, and the accompanying drawings in which:

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

In an embodiment, the invention encompasses a system for wireless communication between a transmitting terminal and one or more receiving terminals. Adaptive coding and modulation (ACM) is used to enhance transmissions. Rather than performing ACM in response to channel state information (CSI) received from a receiving terminal, the transmitting terminal performs predictive link planning using any or all of the following information:

1. Terminal locations as determined by a navigational device or by measuring elapsed time during a planned trajectory.

2. Geometry between two or more terminals, to include distance between terminals and associated pointing angles (e.g. azimuth and elevation angles) between the terminals for the communication path(s).

3. Deterministic channel impairments that affect the average SNR between a transmitting terminal and one or more receiving terminals, as determined by link frequency, terminal locations, time of year, anticipated weather, transmitter output back off (OBO) and distortion, and receiver gain over temperature (G/T) performance. Such effects include, but are not limited to, weather loss effects, multipath effects, terrain blockage effects, error vector magnitude (EVM) effects, relay satellite effects, scintillation and gas loss effects, polarization loss effects, and effects due to additional noise sources based on geometry.

The link parameters to be varied include, for example, modulation type (e.g. BPSK, QPSK, 8PSK, etc.); forward error correction (FEC) code rate and/or code type; symbol rate and bandwidth; and communication frequency. These parameters are used as a priori information to maximize the instantaneous communication link rate between two or more terminals. In a system with more than two terminals, intermediate, or relay, terminals function as both a receiving and a transmitting terminal. The discussion below with regard to transmitting and receiving terminals refers to the interaction between any pair of terminals.

Figure 2:
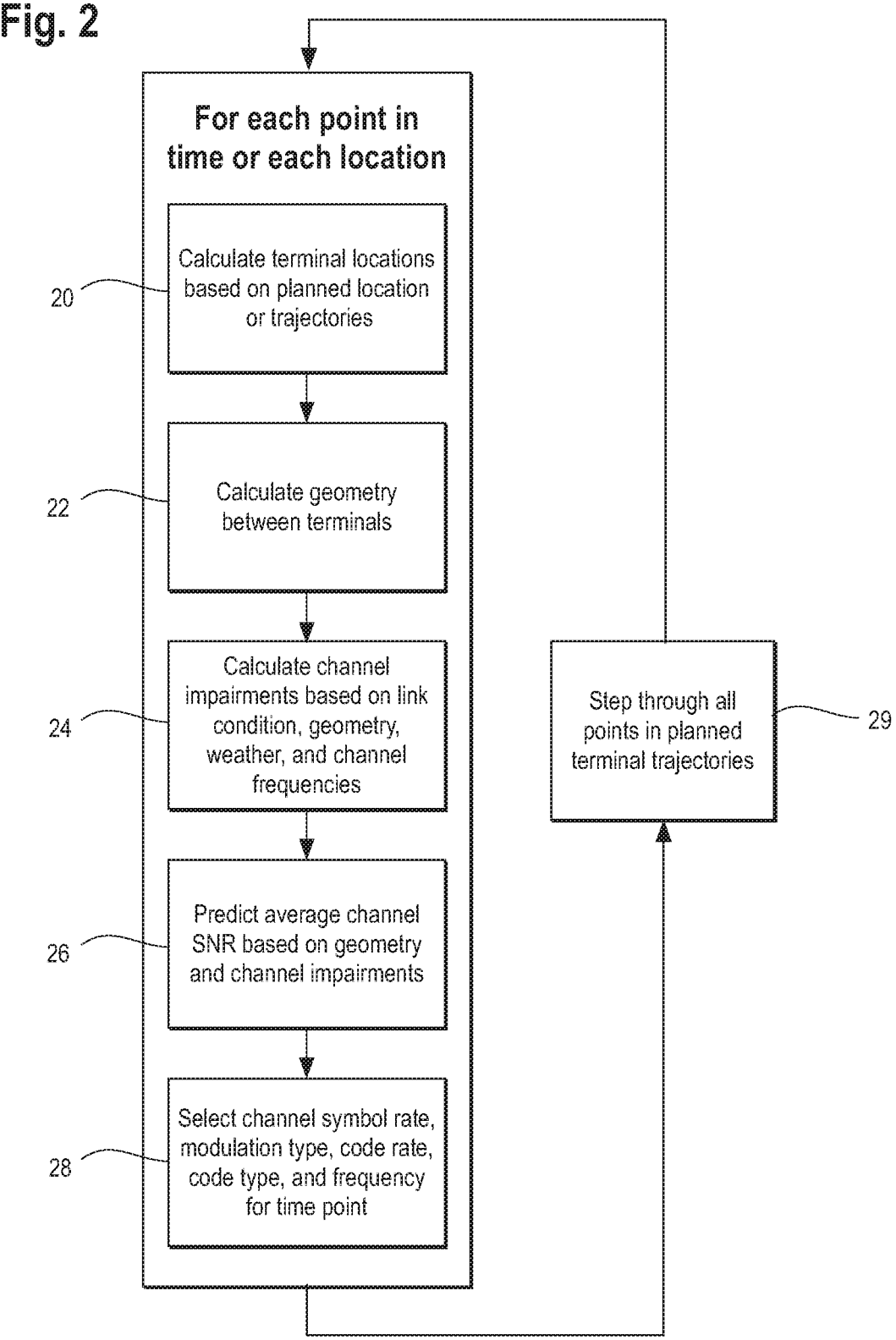
FIG. 2 is a flowchart illustrating a method of generating a lookup table.

A method of predictive link planning according to the present invention is illustrated in FIG. 2. The link between a transmitting terminal and one or more receiving terminals is planned in advance considering the above factors and using a priori information to generate a lookup table that is loaded into the transmitting terminal. The lookup table can specify link parameters based on transmitting terminal location, receiving terminal location, or both transmitting terminal and receiving terminal locations. In addition or as an alternative, the lookup table can specify link parameters based on time when a trajectory of one or both terminals is known. In yet another alternative, multiple lookup tables can be implemented for different frequencies, times of year, or other relevant variations.

Referring to FIG. 2, a method for generating a look-up table is illustrated. For each point in time at step 20, terminal locations are calculated based on planned locations or trajectories of one or both terminals, for example, an orbit or a flight path. The locations include, for example, latitude, longitude or elevation. At step 22, the link geometry between transmitting and receiving terminals is calculated. The link geometry includes, for example, a distance between terminals and associated pointing angles (e.g. azimuth and elevation angles) although other measurements or characteristics could be used. At step 24, the method calculates channel impairments based, for example, on link conditions, link geometry, weather and channel frequencies. At step 26, an average channel signal-to-noise-ratio (SNR) is predicted based on link geometry and channel impairments. At step 28, a channel symbol rate, modulation type, code rate, code type and frequency is then calculated for the current point. Finally, at step 29, the method returns to step 20 for each point in all planned trajectories.

The points in time at which the steps above are performed are selected with a certain frequency. The appropriate frequency depends on the rate of change of the link geometry, which further depends on the transmitting and receiving terminal mobility, both velocity and heading. If the link is changed too infrequently, the link may drop due to unaccounted for changes in link condition. In an embodiment, terminal locations are updated approximately every 30 to 300 seconds.

Figure 1:
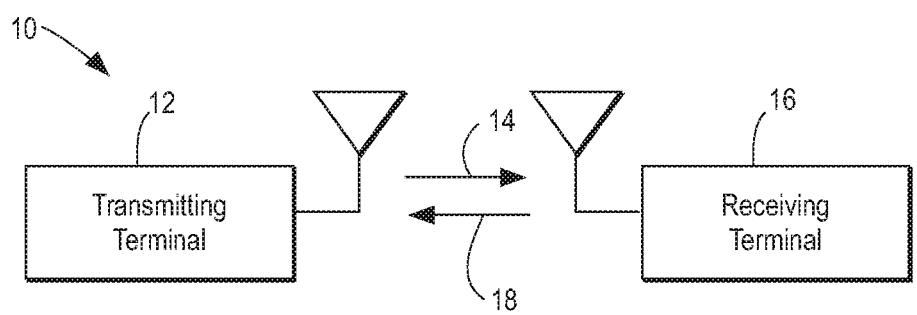
FIG. 1 is a block diagram of a prior art transmission system.
Figure 3:
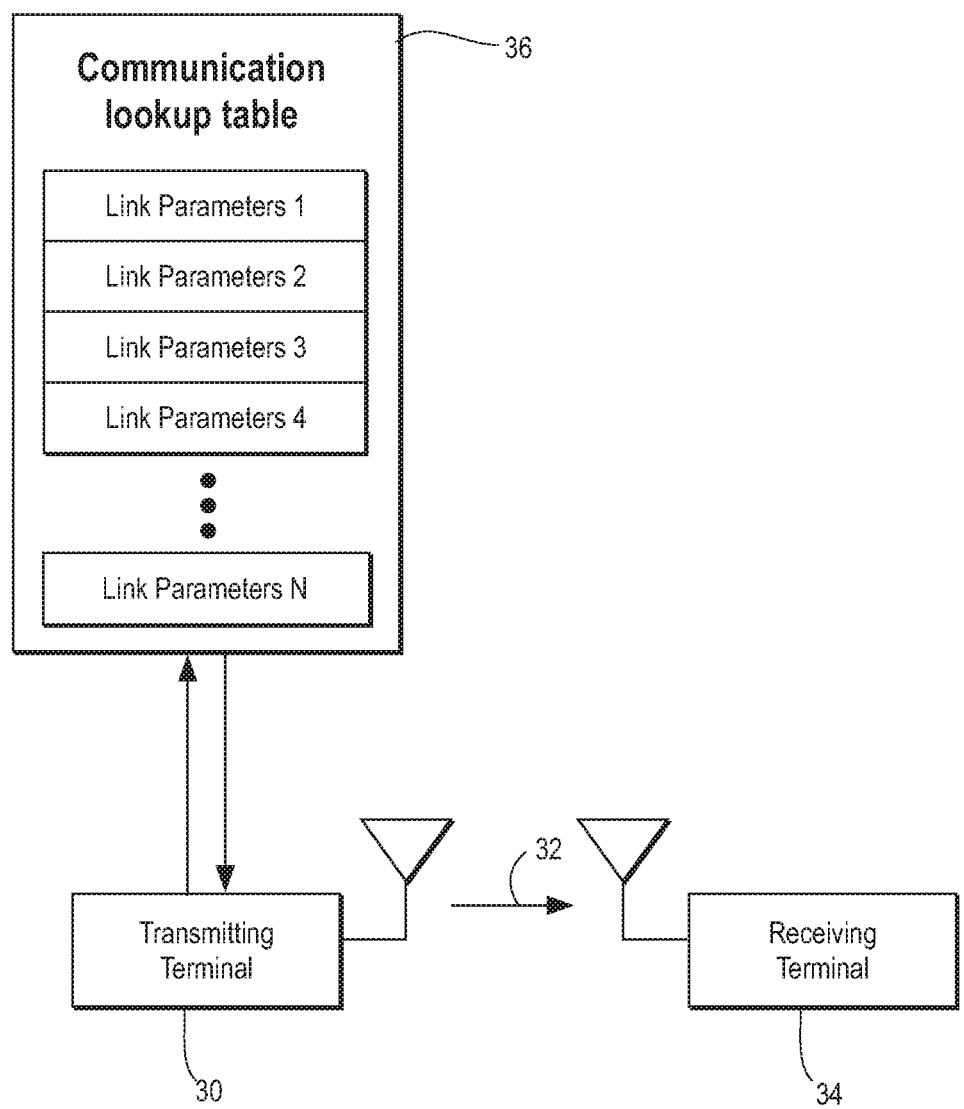
FIG. 3 is a transmission system according to the present invention

A system implementing the look-up table generated by the method of FIG. 2 is shown in FIG. 3. Similarly to FIG. 1, transmitting terminal 30 sends a transmission 32 to receiving terminal 34. However, receiving terminal 34 does not send link parameters over a return link. Instead, transmitting terminal 30 uses values from lookup table 36 to dynamically change the link parameters depending on lookup table values, and the receiving terminal 34 adapts to the link parameters established by transmitting terminal 30. At the beginning of a transmission, transmitter 30 determines time or location values that are used to index lookup table 36, as will be explained in more detail below. Each of transmitting terminal 30 and receiving terminal 34 include one or more processors (not shown) for executing the operations and steps described herein. In an embodiment, lookup table 36 is created in this processor or in one or more other processors external to the transmitting and receiving terminals.

In an embodiment, a method of the invention is performed with no exchange of link metrics between the transmitting and receiving terminals—link adaptation is done entirely based on link performance that is predicted ahead of time, and the process is entirely open loop, with no return CSI exchanged between the receiving and transmitting terminal. The invention in this method relies on a priori knowledge to operate without a return link between the transmitting terminal and receiving terminal, and is suited for applications where a return link may be undesirable or impractical. During a transmission, the receiving terminal detects changes in the transmission and automatically adapts to the modulation and coding selected by the transmitter.

Figure 4:
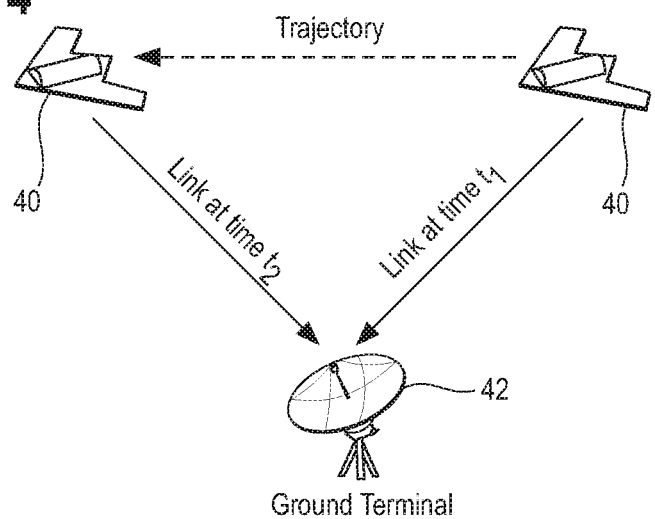
FIG. 4 shows a first embodiment of the transmission system of FIG. 3.

A system and methods according to the invention will be explained in connection with several embodiments. In a first embodiment a mobile transmitting terminal is transmitting to a stationary receiving terminal as depicted in FIG. 4. Aircraft 40 is transmitting to ground terminal 42. Aircraft 40 is shown at two points in time ($t_1$ and $t_2$) as it flies along a trajectory. In this example, although the specific trajectory is not known in advance, the location of the aircraft can be determined at any given time via GPS or a similar navigational device. This allows the link parameters to be determined based on an estimate of transmitting terminal and receiving terminal geometry to account for the changing link conditions (e.g. elevation angle, distance, regional weather) in an a priori fashion. Thus, the method of FIG. 2 prepares a lookup table for all anticipated receiver and transmitter geometries and is indexed by relevant parameters, for example, elevation angle, distance, regional weather, etc. In other words, the transmitting terminal knows its GPS coordinates, and from these it determines the current geometry of the link, particularly in terms of elevation angle and distance, although other dimensions of the link geometry could be used to index the lookup table as well.

In an alternative, the method of the first example is used in the case where an aircraft is flying a planned trajectory that is known ahead of time. In this case, elapsed time could be used instead of aircraft location as an input to the lookup table used for link parameters.

In a second embodiment, a receiving terminal is mobile and a transmitting terminal is either mobile or stationary. In this embodiment, the transmitting terminal, if mobile, knows its location either by elapsed time or by a navigational device. However, the location of the receiving terminal must be determined by the transmitting terminal using elapsed time for a known trajectory.

Figure 5A:
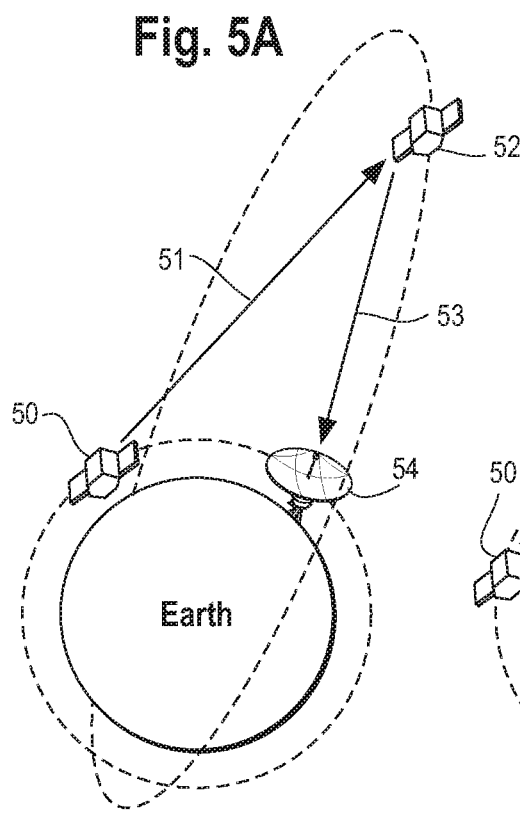
FIGS. 5A and 5B show a second embodiment of the transmission system of FIG. 3.
Figure 5B:
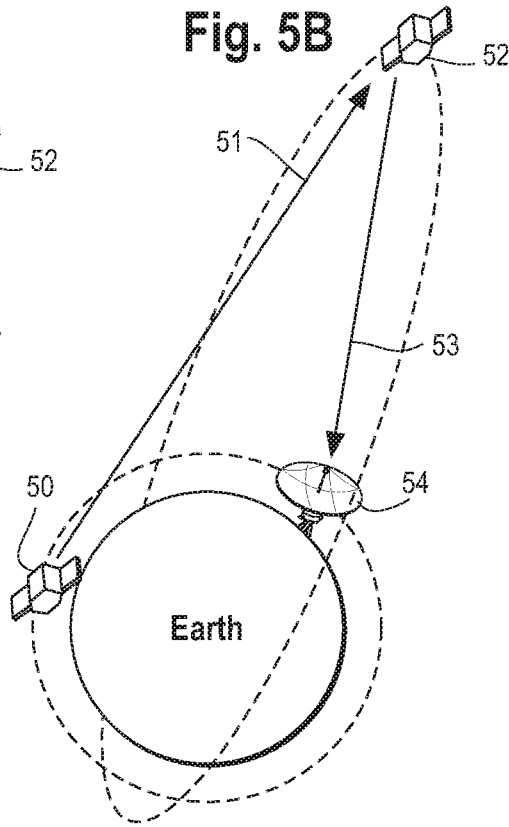

A third embodiment of the invention is described in connection with FIGS. 5A and 5B. This embodiment features multiple receivers and transmitters, and is comprised of, for example, an orbiting satellite 50 transmitting to a ground station 54 through an orbiting relay satellite 52. While ground station 54 is stationary, both satellites 50 and 52 are mobile. Representative locations, and therefore overall link geometry, at a time $t_1$ are shown in FIG. 5A, and representative locations are a time $t_2$ are shown in FIG. 5B. Since the satellites have fixed and known orbits, the exact location of both satellites 50 and 52 at any given time is known a priori. This allows a lookup table to be constructed that varies the link parameters to accommodate the changes in link geometry for link 51 between satellites 50 and 52, as well as the changes in link geometry for link 53 between the relay satellite 52 and the ground station 54 entirely on information that is known beforehand. In this case, the lookup table would be indexed based on elapsed time, and the geometry of each link 51 and 53 is used to estimate signal to noise ratio (SNR) via a separate lookup table, with the composite link SNR, given by the equation $$SNR_{Composite} = \frac{1}{SNR_1} + \frac{1}{SNR_2},$$

where $SNR_1$ is for link 51 and $SNR_2$ for link 53, and all equation terms are linear. As described above, the transmitting terminal determines the channel SNR for the entire channel all the way to ground station 54 and relay satellite 52 simply receives and retransmits the signal without demodulation without changing any signal parameters of interest such as modulation type, code rate, symbol rate, etc. In an alternative embodiment, relay satellite 52 functions as both a receiving terminal and a transmitting terminal. In this alternative embodiment, the entire channel is essentially a 2-hop (or more) relay link where transmitting satellite 50 and relay satellite 52 form a transmit-receive pair, as do relay satellite 52 and ground station 54. Thus, relay satellite 52 would use its own lookup table when transmitting similar to that described above for the transmitting terminal.

A fourth embodiment of the invention is described in connection with FIG. 6. This embodiment features a single satellite transmitter 60 and multiple ground station receivers 62 and 64. Since the satellite 60 has fixed and known orbits, and the location of each ground receiver 62, 64 is fixed, the geometry to each of the ground stations can be determined a priori. In this embodiment multiple lookup tables for each ground station can be constructed, and for each point in time the optimal ground station that maximizes the communication rate can be selected based on a priori link calculations, achieving an optimal link not only to each ground station, but among multiple ground stations without the use of return link CSI.

Although specific embodiments have been discussed in connection with FIGS. 4-6, these are representative for the purposes of explaining the invention. Any of the transmitting terminals, receiving terminals, or relays may be mobile or stationary. A mobile terminal or relay may be, for example, a satellite or a manned or unmanned aircraft. A transmitting terminal may be mobile or stationary, with its location determined either by a navigational device or elapsed time for a known trajectory.

Figure 6:
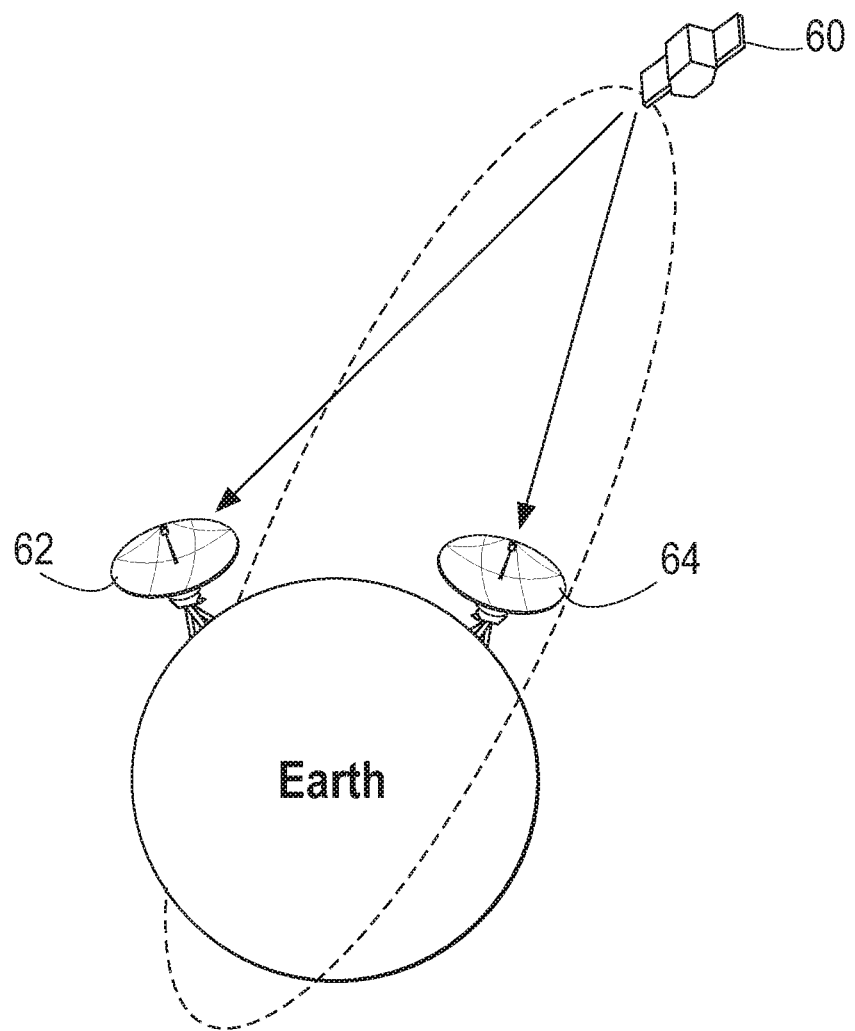
FIG. 6 shows a third embodiment of the transmission system of FIG. 3.

In the embodiments of FIGS. 5 and 6, the relay between a source transmitting terminal and a destination receiving terminal may be either mobile or stationary, but the location of the relay must be determined by the source transmitting terminal using elapsed time for a known trajectory. Further, a system according to the present invention may include more than one relay.

A destination receiving terminal may also be mobile or stationary but the location of the destination receiving terminal must be determined by the source transmitting terminal using elapsed time for a known trajectory.

Numerous alternative implementations of the present invention exist. For example, other applications include a race car telemetry link for a car following a known trajectory around a race course, or commercial shipping applications in which an aircraft or ship navigates along well established routes, or railway systems that are constrained to navigation along predetermined track locations. Although not specifically depicted, two or more relay terminals may be used in a system according to the present invention.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method of transmitting data from a transmitting terminal to a receiving terminal over a channel, comprising the steps of:
    determining a series of locations for each of the receiving terminals and for exactly one transmitting terminal;
    determining a link geometry of the channel between the transmitting terminal and the receiving terminal for each location in the series of locations, wherein determining the link geometry comprises determining a distance between the transmitting and receiving terminals for each location in the series of locations;
    determining channel impairments for the link geometries by varying link parameters;
    using the link parameters as a priori information to maximize an instantaneous communication link rate between the receiving terminal and the transmitting terminal;
    predicting signal-to-noise ratios (SNRs) of the channel for the link geometries and the channel impairments;
    storing channel parameters based on the predicted SNRs in a lookup table; and
    transmitting data from the transmitting terminal using channel parameters retrieved from the lookup table, wherein the channel parameters are retrieved from the lookup table using the distance between the transmitting and receiving terminals.

2. The method of claim 1, wherein the step of determining a link geometry further comprises determining associated pointing angles between the transmitting and receiving terminals for each location in the series of locations.

3. The method of claim 1, wherein the channel parameters further comprise at least one of a channel symbol rate, modulation type, code rate, code type or frequency.

4. The method of claim 1, wherein the channel further comprises one or more relay terminals and the step of determining a series of locations further comprises determining locations of the one or more relay terminals.

5. The method of claim 4, wherein the step of determining a link geometry of the channel comprises determining a first link geometry between the transmitting terminal and the one or more relay terminals and a second link geometry between the one or more relay terminals and the receiving terminal, for each location in the series of locations.

6. The method of claim 1, further comprising, before the step of determining a series of locations, a step of using elapsed time or location to select the receiving terminal from a set of receiving terminals based on a priori knowledge of link geometry and an estimate of the current location of the transmitting terminal.

7. The method of claim 1, wherein the receiving terminal detects changes in the transmitting data and automatically adapts to the modulation and coding selected by the transmitting terminal.

8. The method of claim 1, wherein the lookup table further comprises a plurality of lookup tables for different frequencies or times of year.

9. A transmitting terminal in a communication system, said transmitting terminal sending data to a receiving terminal in the communication system using the method of claim 1.

10. The communication system of claim 1, wherein the link parameters comprise one or more of a modulation type, a forward error correction (FEC) code rate and/or code type; symbol rate and bandwidth; and communication frequency.

* * * * *